United States Patent [19]
Tudhope et al.

[11] Patent Number: 5,988,208
[45] Date of Patent: Nov. 23, 1999

[54] GAS CONTAINMENT AND DELIVERY SYSTEM

[76] Inventors: Andrew Tudhope, 522 Silver Lake Dr., Danville, Calif. 94526; David Jordan, 12581 Clayton Rd., San Jose, Calif. 95127; Jerry Jones, 4271 N. First St., #100, San Jose, Calif. 95134-1213

[21] Appl. No.: 08/678,375

[22] Filed: Jul. 2, 1996

[51] Int. Cl.⁶ .................................................... F16L 3/00
[52] U.S. Cl. ....................... 137/382; 137/360; 137/377; 137/362
[58] Field of Search .................. 137/377, 382, 137/360, 362

[56] References Cited

U.S. PATENT DOCUMENTS

| | | | |
|---|---|---|---|
| 3,136,442 | 6/1964 | Massey | 137/360 |
| 3,831,625 | 8/1974 | Roediger | 137/337 |
| 5,522,420 | 6/1996 | Martin | 137/382 |
| 5,687,757 | 11/1997 | Heintz et al. | 137/377 |

*Primary Examiner*—A. Michael Chambers
*Attorney, Agent, or Firm*—McCutchen, Doyle, Brown & Enersen, LLP

[57] ABSTRACT

A gas containment and delivery system that can be efficiently and cost-effectively adapted to a wide variety of gas delivery needs. The system has a gas containment box that can be efficiently adapted to provide double containment for sections of toxic gas lines having gas delivery components such as valves, regulators, and gauges. The system may be either floor-mounted or wall-mounted, and can be used in a wide variety of semiconductor fabrication facilities.

15 Claims, 5 Drawing Sheets

GAS CONTAINMENT AND DELIVERY SYSTEM

FIELD OF THE INVENTION

The present invention relates to the field of gas containment and delivery and, more particularly, to gas containment and delivery systems used in the field of semiconductor processing.

BACKGROUND OF THE INVENTION

Toxic gases used for semiconductor processing and other industrial purposes must be stored and used in accordance with strict regulations. Laws recently enacted in most states require that toxic gases be stored and delivered in lines or vessels that have at least two levels, or layers, of containment. The second containment layer protects people from exposure to the toxic gases in the case of an accident or leak affecting the first containment layer. For example, gas lines carrying toxic gases commonly consist of co-axial tubing. The gas flows through the inner tubing; the outer tubing provides extra containment in case there is a leak in the inner tubing. Gas storage and delivery systems having two containment layers are commonly called "double containment" systems.

Semiconductor manufacturers have had difficulty complying with the new toxic gas containment laws in an efficient manner because semiconductor manufacturing facilities vary widely in size, configuration and purpose. A double containment system that works well in one fabrication facility may not be useful at all in another facility. Companies, therefore, have had to develop a wide variety of double containment gas storage and delivery systems customized to accommodate the unique requirements of the various semiconductor manufacturing facilities throughout the United States. Development of such custom double containment systems is costly, inefficient, and time consuming.

In this regard, prior to the development of the present invention, no standard product was available to provide double-containment for a wide variety of possible configurations of gas delivery components, such as valves, gas lines, regulators and gauges, used in toxic gas delivery systems. Double containment boxes enclosing such components had to be designed on a "one-off" basis to accommodate the particular gas delivery components and the number of gas lines required for each specific application. As a result, engineering and design efforts were duplicated every time a new containment box was needed. Moreover, prior art boxes generally were not designed to be modifiable or moveable in any way. Thus, if the user wanted to change a component or move the box, he was unable to utilize the existing box without extensive modifications.

Additionally, gas lines are commonly connected to each other and to other gas delivery components by welding the joints. Movement of gas containment boxes and/or replacement of gas delivery components, therefore, commonly requires welding. Welding inside a fabrication facility can cause contamination problems and is often difficult to accomplish when space is confined.

Finally, most conventional gas containment boxes are designed to be wall-mounted. In many cases, the size of the fabrication facility is limited and wall space could be better utilized. For this reason, it would be desirable to set the boxes in the floor to make better use of available wall space. Unfortunately, conventional wall-mounted boxes generally are not suitable to be set in the floor without extensive customization.

Many of the problems described above are also applicable to gas containment/delivery systems in which double containment is unnecessary. For example, while there is no need for double containment for containment/delivery systems for inert, nontoxic gases, such systems suffer from the same problems of difficult customization described above.

Accordingly, there is a need for improved gas containment and delivery systems that eliminate or reduce disadvantages associated with the prior art.

SUMMARY OF THE INVENTION

The present invention encompasses improved gas containment and delivery systems that can be efficiently and cost-effectively adapted to a wide variety of gas delivery needs. A preferred embodiment of the present invention encompasses a gas containment box that can be efficiently adapted to provide double containment for sections of toxic gas lines having gas delivery components such as valves, regulators, and gauges. Such gas containment systems may be either floor-mounted or wall-mounted, and can be used in a wide variety of semiconductor fabrication facilities.

One object of the present invention, therefore, is to provide improved gas containment and delivery systems that eliminate or reduce disadvantages associated with the prior art.

Another object of the present invention is to provide an efficient means of double containment for gas storage and/or delivery systems.

Still another object of the present invention is to provide double containment boxes that can be used with sections of a gas delivery system that include a variety of gas delivery components.

Yet another object of the present invention is to provide double containment boxes that can be efficiently customized.

A further object of the present invention is to provide double containment boxes that can be easily adapted to fit a wide variety of configurations of gas delivery components, and a wide variety of semiconductor fabrication facilities.

A still further object of the present invention is to provide double containment boxes that can be easily moved to various locations within the user's facility.

Yet a further object of the present invention is to provide gas containment/delivery boxes that can be modified at any time.

Yet a further object of the present invention is to reduce or eliminate the contamination generation issues previously associated with this type of product.

These and other objects and advantages of the present invention will become apparent to those skilled in the art from the following detailed description, the accompanying drawings, and the appended claims.

DETAILED DESCRIPTION

Preferred embodiments of the present invention include gas containment boxes capable of being customized to provide double containment for sections of toxic gas lines having gas delivery components such as valves, regulators, and gauges. Such a gas containment box may be either floor-mounted or wall-mounted. Because containment boxes according the present invention may be customized or adapted to the unique requirements of each facility's gas storage and delivery system, these containment boxes allow users to save engineering time and expense in the installation and use of gas containment boxes. Additionally, these containment boxes allow for easy replacement of components and minimize contamination issues related to welding.

One embodiment of a gas containment box according to the present invention, is described in connection with FIGS. 1 and 2. This gas containment box comprises a base portion (shown in FIG. 2) on which gas delivery components are mounted and a cover portion (shown in FIG. 1) that is designed to be removably attached to the base portion to form a housing surrounding the gas delivery components. The removable cover portion permits users to conveniently access all components inside the box so that they can easily make adjustments or replace components.

Figure 1:
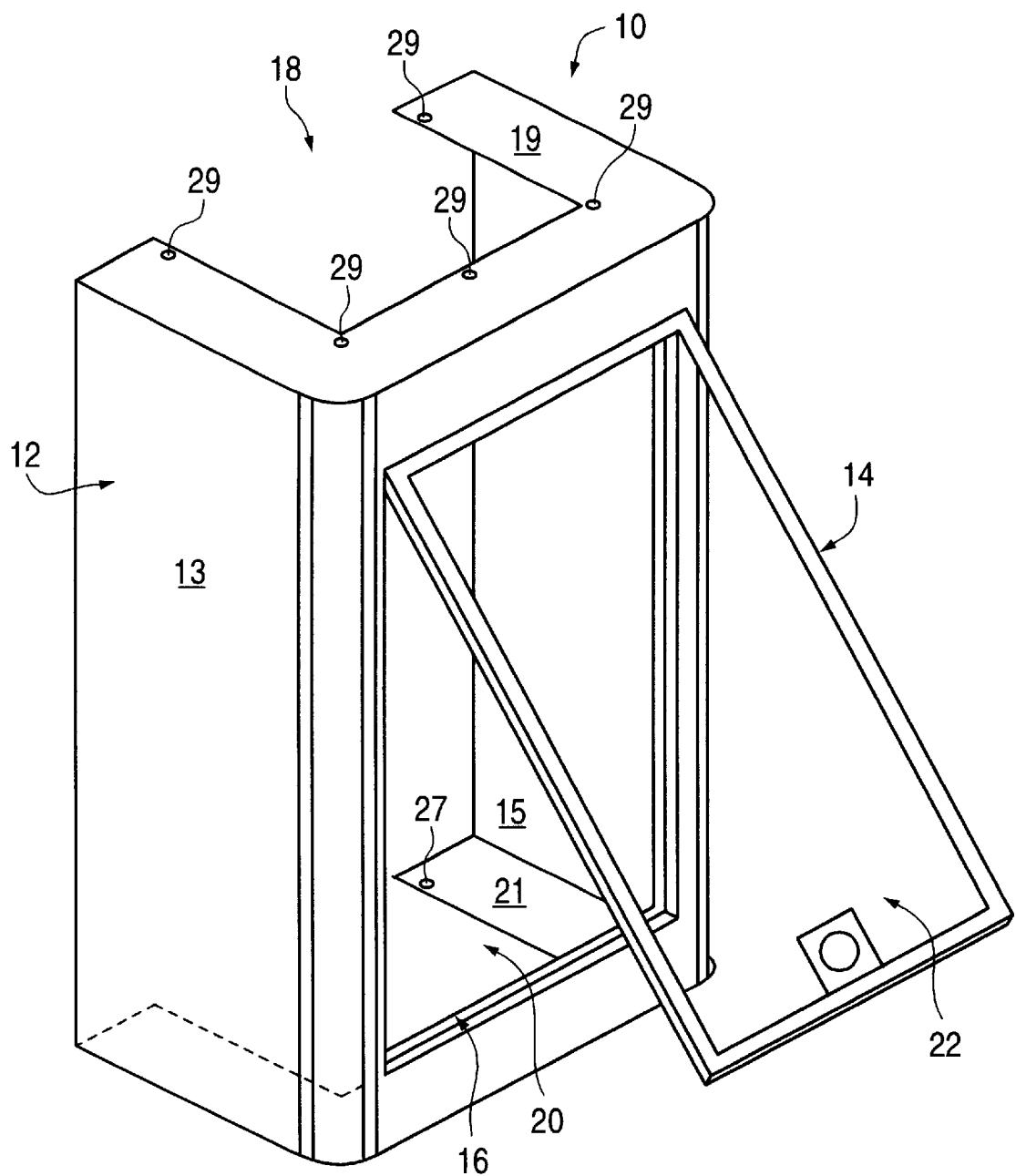
FIG. 1 shows an exterior view of the cover portion of one embodiment of a gas containment box according to the present invention.
Figure 2:
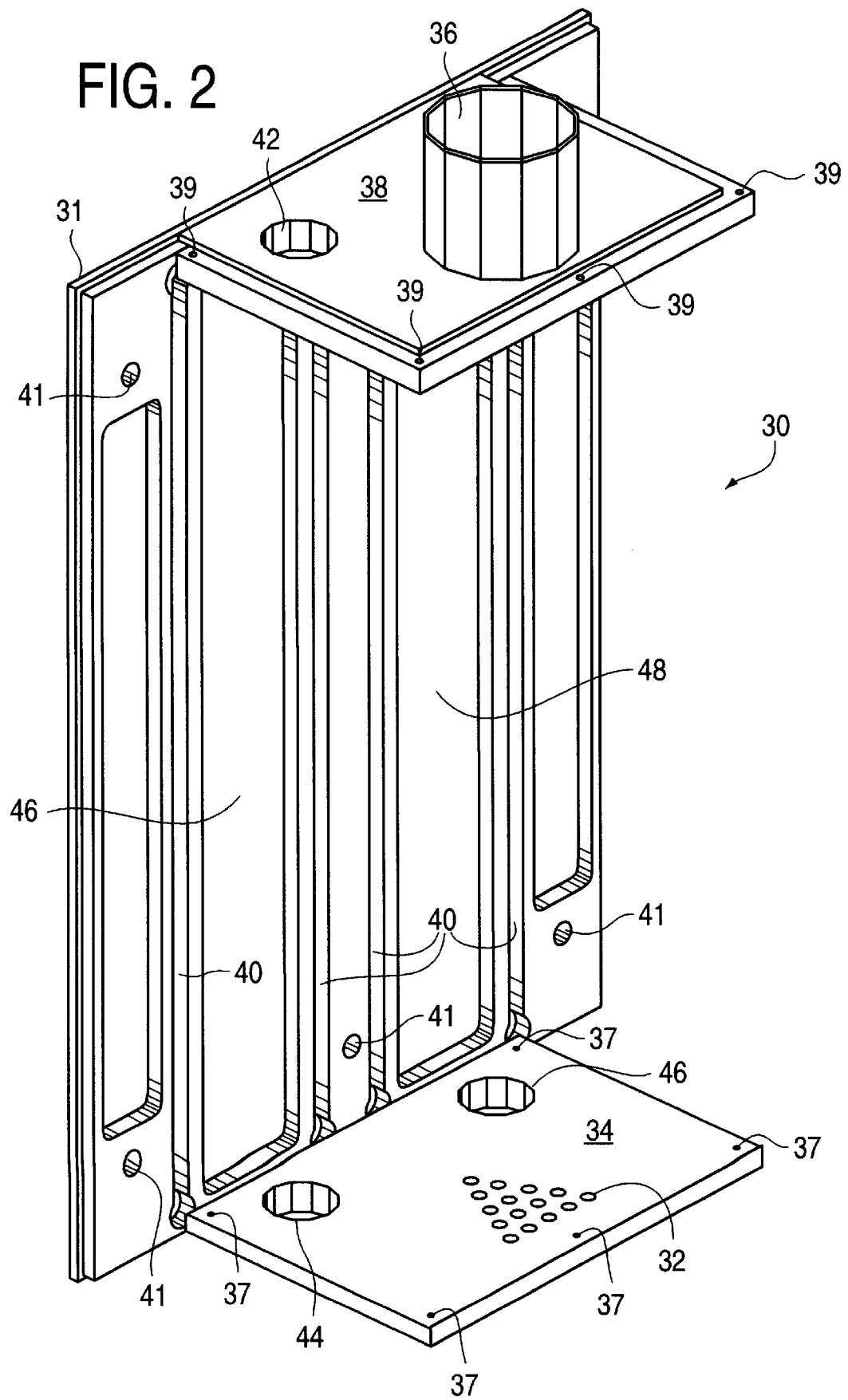
FIG. 2 shows an interior view of the base portion of one embodiment of a gas containment box according to the present invention, which base portion is designed to be used with the cover portion shown in FIG. 1.

The gas containment box shown in FIGS. 1 and 2 is designed to accommodate almost all special requirements that a customer may have in a typical tab. The box can be customized to fit a variety of applications. For example, the box will accommodate almost any gas delivery component currently on the market with no changes to the box's basic structure.

FIG. 1 shows an exterior view of cover portion 10 for a gas containment box according to the present invention. As shown in FIG. 1, cover portion 10 has a main chassis 12, which has a first side 13 and a second side 15, a hinged door 14 that can be used to seal a front opening 16, an upper opening 18 in the top 19 of the cover portion 10, and a lower opening 20 in the bottom 21 of the cover portion 10. Door 14 has a handle 17. Cover 10 preferably is constructed of 316 stainless steel. The back of cover 10 is open.

Door 14 is self-closing to ensure double-containment unless it is purposely being held open by someone. The width of door 14, cover portion 10, and openings 18 and 20 depend on how many gas lines are being run; the width should be sufficient to ensure access to all components. For example, many configurations of the wall-mounted box allow 1 to 4 lines, many configurations of the floor-mounted box allow up to 6 lines, and many configurations of the wall-mounted plates for inert gases can accommodate and even larger number of lines. Openings 18 and 20 should be wide enough to accommodate all gas lines.

Door 14 preferably includes a center panel 22. Center panel 22 is made of transparent or see-through material in order to allow one to view all components within the box without opening door 14. Center panel 22 preferably is made of either glass or, particularly in the case of a floor-mounted box, clear polycarbonate. The thickness of a glass panel depends (in a conventional manner) on the unique requirements of the various fabs. The thickness of a polycarbonate panel depends in a conventional manner on load requirements, as heavy equipment may be moved over it.

Cover portion 10 is removably attached with screws to base portion or "base plate" 30, shown in FIG. 2, to form a containment box referred to herein as containment box 1. Base portion 30 has a back plate 31, a top (upper) plate 38, and a bottom (lower) plate 34. Top plate 38 fits into opening 18 and attaches to top 19 with screws or bolts through screw holes 29 and 39. Similarly, bottom plate 34 fits into opening 210 and attaches to bottom 21 with screws or bolts through screw holes 27 and 37.

Base portion 30 preferably is made of hard anodized aluminum, although other materials will work provided that the materials do not react with any of the gases running through the box should the gases become exposed to the box. For this reason, materials such as plastic generally cannot be used, although hard poly will suffice for some applications because it cannot be attacked by corrosive gases such as HCI and Hbr.

When cover portion 10 and base portion 30 are attached to one another, they form gas containment box 1 according to the present invention. The box preferably is not hermetically sealed. Instead, the box preferably has a metal-to-metal seal between back plate 31 and sides 12 and 15 and allows a predetermined, controlled rate of air (or gas) flow, such as of 10 cubic feet per minute, through the box. To ensure adequate air flow, base portion 30 includes small holes 32 through its lower plate 34, as shown in FIG. 2, as well as the circular extrusion 36 through its upper plate 38. In FIG. 2, holes 32 are grouped in the shape of a triangle. It will be apparent to those skilled in the art that the shape, number, and arrangement of the holes are not critical in many embodiments of the present invention. Indeed, in some embodiments, there are no holes. The holes may also be louvered or partially covered in any conventional manner to adjust the rate of airflow as desired.

Base portion 30 shown in FIG. 2 has a track system built in. Tracks 40 allow brackets to slide up and down the length of base portion 30 along component slots 46 and 48 and back plate 31 to accommodate components of various heights and widths. Thus, not only can the user accommodate any component he chooses to use at a given time, but he can incorporate a different component at a later time utilizing the same double containment box, even if the component does not have the same dimensions. The box is also moveable so that it can be utilized in other areas of the fabrication facility should the user decide he wants to use it elsewhere. It is attached to the wall using bolts through bolt holes 41. Tubing holes 42, 44, and 46 allow the gas lines to be connected to the gas delivery component within the box.

Tracks 40 are spaced with a distance of between 1.5-in and 4-in. from the center of one track to the center of another used for mounting any particular component. They should not be closer together than 1.5" because the components in one line may overlap onto components on another line (when mounted on the brackets which slide in the track system). Or, when a component that has an open/close knob is rotated, it may run into a component in another line if the tracks are closer than 1.5".

Figure 3:
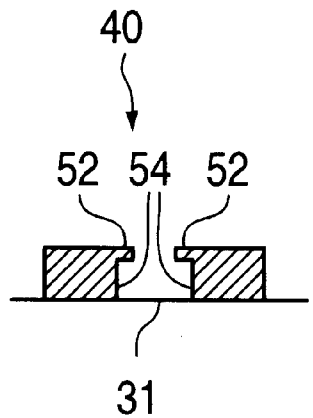
FIG. 3 shows a cross sectional view of a track in one embodiment of a track system according to the present invention.

A cross-sectioned view of a track 40 is shown in more detail in FIG. 3. As illustrated in FIG. 3, each track 40 has lip portions 52 over side walls 54, which are attached to back plate 31. As explained further herein, this allows brackets for mounting components to slide along tracks 40.

Figure 4:
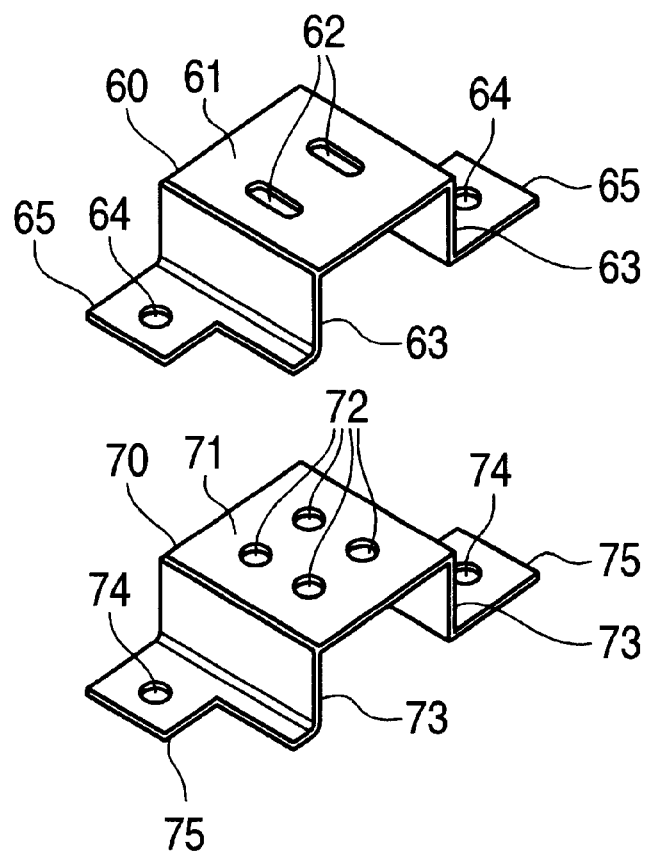
FIG. 4 shows a typical set of brackets for use with the present invention.

A typical set of brackets for use in the present invention is shown in FIG. 4. Brackets 60 and 70 include component mounting walls 61 and 71, respectively, bracket side walls 63 and 73, respectively, and bracket mounting walls 65 and 75, respectively. Brackets 60 and 70 also include component mounting holes 62 and 72 through walls 61 and 71, respectively, and bracket mounting holes 64 and 74 through walls 65 and 75, respectively. Gas delivery components are mounted to brackets 60 and 70 using component mounting holes 62 and 72, respectively, in a conventional manner. The height of the brackets (i.e., the distance between wall 61 and wall 65 or between wall 71 and wall 75) is designed so that the center lines of the gas components mounted on these brackets are in-line with the centers of the tubing holes for the relevant tracks.

For example, in the base plate shown in FIG. 2, tubing holes 42 and 44 are designed to be used with components mounted on brackets along component slot 46, the brackets being mounted to the tracks adjacent to component slot 46 on each side. Assuming bracket 60 is used with component slot 46, walls 65 are placed above the lips 52 and tightened against the lips using a locking washer of any conventional type that is located within the track. To slide a bracket up or down the relevant component slot, one merely needs to loosen the bolts between the brackets and the washer and then slide the bracket along the slide when affixed, to gas lines that enter the box through tubing holes 42 and 44.

The brackets shown in FIG. 4 accommodate a wide variety of valves, regulators, and gauges to ensure that the centerline on the installed components is uniform. These brackets are of different heights to accommodate the different distances from center of the gas line to edge of component at mounting (i.e., "height") of various gas delivery components. They thus act to equalize the heights of each component and allow users to achieve a uniform centerline. Brackets for use with the present invention preferably are made of aluminum. The brackets preferably are of different "heights" to ensure that the components' centerline is uniform. (Not all gas delivery components are the same height. For example, a valve may be much shorter than a gauge to overall height.) This is important for case of connection of the components (i.e. if one component is supposed to attach to another component that is ⅛ of an inch shorter in height, it's going to be difficult to screw them together and ensure the integrity of the seal.)

The brackets can vary in height and width to accommodate any component. There is no "standard" or "preferred" range. As long as component manufacturers continue to develop new components with different heights and specifications, brackets can be made to accommodate the new components in a conventional manner.

Fittings are commonly connected to gas delivery components by welding. As mentioned above, however, it is often difficult to weld within the box (a confined space) or undesirable due to the risk of contamination. To reduce the need for welding every time a component is changed, a screw-mountable fitting (male or female) may be welded to the ends of gas lines entering through tubing holes 42 and 44. To accommodate the size of these fittings, tubing holes 42 and 44 are made much larger than the tubing, resulting in an air gap between the gas lines and the walls of tubing holes 42 and 44.

To eliminate the resulting air gap between tubing holes 42 and 44 and the gas lines entering through them, a conventional bulkhead fitting is placed around the relevant portions of each piece of tubing prior to welding the screw mountable fittings to the end of the tubing. In addition, prior to welding, a custom bulkhead fitting adapter (described below) is placed around the tubing and coupled to the bulkhead fitting. After the end of the tubings is placed through the tubing hole and screwed to the relevant component, the bulkhead fitting adapter is attached to the tubing hole.

Figure 6:
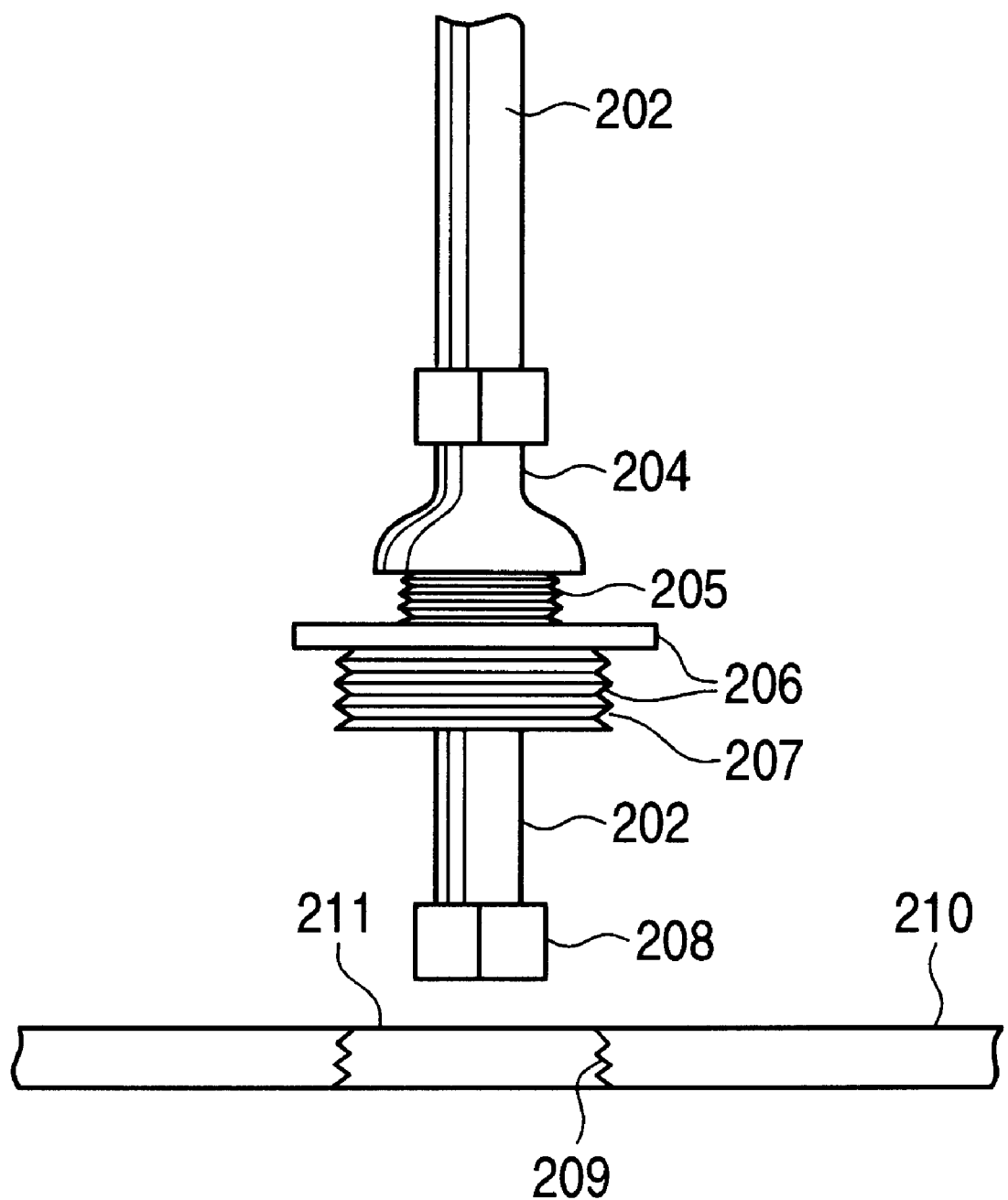
FIG. 6 shows a cross-sectional view of one embodiment of a bulkhead fitting assembly according to the present invention.

FIG. 6 shows one embodiment of a bulkhead fitting assembly according to the present invention. As shown in FIG. 6, tubing 202 is placed through bulkhead fitting 204 and bulkhead fitting adapter 206 before screw-mountable fitting 208 is welded to the end of tubing 202. The male threads 205 of bulkhead fitting 204 are screwed into the internal female threads (not shown) of adapter 206. The male threads 207 of adapter 206 are designed to be screwed into the female threads 209 of a box top 210. This bulkhead fitting assembly allows screw-mountable fitting 208 to be welded to tubing 202 before it is inserted into the box, while allowing the opening 211 in box top 210 to be sealed with adapter 206 and bulkhead fitting 205 after the tubing is inserted into the box.

The removable bulkhead fitting assembly allows the welding of the gas sticks (comprised of various components) used in the box to be performed outside of the fab or chase areas. This eliminates the potential contamination that welding can cause in the fab or chase and also allows the user to weld the components in a controlled environment, where they will not be exposed to any contamination.

Exemplary and conventional gas delivery components that may be used with the present invention are listed below:

1. valves
2. regulators
3. purifiers
4. filters
5. gauges
6. tubing
7. pressure transducers
8. check valves
9. switches
10. mass flow controllers (MFCs)

Figure 5:
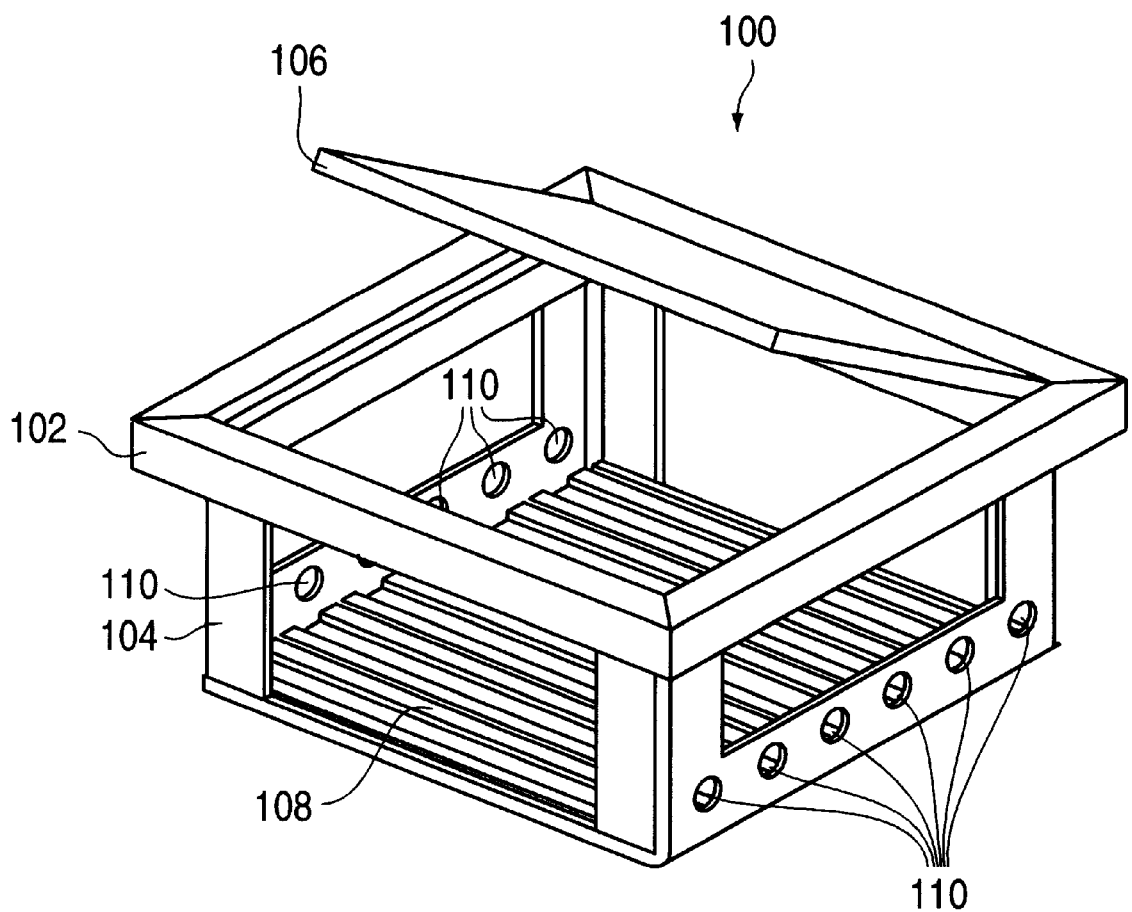
FIG. 5 shows one embodiment of a floor box according to the present invention.

FIG. 5 shows an embodiment of a floor containment box (or floor box 100 according to the present invention designed to be floor-mounted. In the case of a floor box, the design of the cover portion and the base portion are slightly different. More particularly, the main chassis 102 (analogous to chassis 12) preferably is designed to remain mounted to base portion 104 (analogous to base portion 30), instead of being removed by the user. The removable cover portion 106 of the floor box consists essential of the door, which in this case preferably is made of hardened polycarbonate. While the floor box cover/door 106 preferably is fully removable, this depends on the customer's specification. The cover/door can be attached to the rest of the unit with a hinge, or it can have handles mounted on it so that it may be lifted off.

Floor box 100 is made to accommodate a standard 2"×2" raised floor system (or customized to the specifications of the user's floor) so that any floor tile can be removed and replaced by the floor box. Floor box 100 includes track system 108 along base portion 104 for mounting components in the manner described above, and tubing holes 110 used as described above.

While the present invention has been described in connection with semiconductor processing applications, it will be apparent to those skilled in the art that the present invention can be utilized in any other gas delivery application, such as any manufacturing operation requiring gas delivery in a clean room or controlled environment.

The present invention is defined by the claims. Various modifications of the present invention that are encompassed by the claims will become apparent to those skilled in the art from the foregoing detailed description and accompanying drawings. Such modifications are within the scope of the present invention.

For example, the basic elements of a gas containment system according to the present invention can also accommodate inert gases, which do not require a secondary layer of containment. To accommodate this use, the cover of the box preferably is removable, and the base which contains the track system and brackets can be utilized in the same way to accommodate components used for inert gas delivery.

The inert gases do not require the sides and/or cover of the box. In the case of inerts running on a wall in the fab, the back plate which contains the track system and brackets can be mounted on the wall to accommodate the user's components of choice. In the case of inert lines running below the raised floor, the basic structure of the toxic floor box without the side panels can be utilized to mount inert gas delivery components. As with the product designed for toxics, the bases or plates used for inerts can be moved throughout the fab, providing flexibility for semiconductor manufacturers or other users.

In summary, the same issues of customization that the product for toxics addresses are also relevant and can be applied to inert gas delivery, in many cases more easily. In fact, the mounting plate, track system and brackets can readily be applied to mounting any type of gas delivery.

The mounting plate, track system and brackets can also be applied to mounting any type of gas delivery component anywhere in a fab. Because of the flexible nature of the product, it can easily be modified to be a toxic box, an inert plate (without the sides or cover), or simply a mechanism for mounting virtually any type of gas delivery component.

Lastly, both the floor and wall boxes can be easily integrated into most existing gas delivery systems in semiconductor manufacturing facilities today, regardless of whether the facility is new or mature. The box, whether for toxics or inerts, can be dropped into and hooked up to the user's current system with very little effort.

What is claimed is:

1. A secondary layer container for containing gas delivery components comprising:
   a container base portion having formed therein a plurality of tracks, each of said plurality of tracks configured to slideably receive one or more removable gas delivery component mounting brackets for adjustably mounting gas delivery components, said gas delivery component mounting brackets having:
     a component mounting surface, said component mounting surface adapted for fixed attachment of a gas delivery component thereto, and
     a track mounting surface, said track mounting surface adapted for fixed attachment of said gas delivery component mounting bracket to said container base portion, and
   wherein a gas delivery component, while fixedly attached to one or more of said component mounting surfaces, remains slidably positionable with respect to said container base portion; and
   a container cover portion attached to the base portion for enclosing the gas delivery components.

2. The gas containment system of claim 1, further comprising brackets for mounting gas delivery components to the track system, wherein each gas delivery component is mounted to a bracket, and each bracket is adjustably mounted to a track within the track system.

3. The gas containment system of claim 1, wherein the cover portion comprises a door.

4. The gas containment system of claim 3, wherein the door is removable.

5. The gas containment system of claim 3, wherein the door comprises transparent material.

6. The gas containment system of claim 5, wherein the door comprises glass.

7. The gas containment system of claim 5, wherein the door comprises clear polycarbonate.

8. The gas containment system of claim 1, wherein the box is wall-mounted.

9. The gas containment system of claim 1, wherein the box is floor-mounted.

10. The gas containment system of claim 1, where the cover portion is removable.

11. The gas containment system of claim 1, further comprising a removable bulkhead fitting.

12. The gas containment system of claim 11, further comprising a bulkhead fitting adapter.

13. A secondary layer container for containing gas delivery components, comprising:
   a housing having located within and incorporated with the housing a plurality of tracks, each of said plurality of tracks configured to slidably receive one or more removable gas delivery component mounting brackets, said gas delivery component mounting brackets having:
     a component mounting surface, said component mounting surface adapted for fixed attachment of a gas delivery component thereto, and
     a track mounting surface, said track mounting surface adapted for fixed attachment of said gas delivery component mounting bracket to said housing, and
     wherein a gas delivery component, while fixedly attached to one or more of said component mounting surfaces, remains slidably positionable with respect to said housing.

14. The gas containment system of claim 13, further comprising a bulkhead opening.

15. The gas containment system of claim 13, wherein the housing comprises a base portion attached to the track system and a cover portion.

* * * * *